United States Patent
Hsu et al.

(10) Patent No.: US 11,795,529 B1
(45) Date of Patent: Oct. 24, 2023

(54) LOW-MELTING-POINT ALLOY COMPOSITE MATERIAL AND COMPOSITE MATERIAL STRUCTURE

(71) Applicant: Industrial Technology Research Institute, Hsinchu (TW)

(72) Inventors: Chia-Cheng Hsu, Hsinchu County (TW); Hsu-Shen Chu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/883,641

(22) Filed: Aug. 9, 2022

(30) Foreign Application Priority Data

Jun. 20, 2022 (TW) .................................. 111122824

(51) Int. Cl.
    *B32B 15/01* (2006.01)
    *C22C 28/00* (2006.01)
    *C22C 30/04* (2006.01)

(52) U.S. Cl.
    CPC .............. *C22C 28/00* (2013.01); *B32B 15/01* (2013.01); *C22C 30/04* (2013.01); *B32B 2307/302* (2013.01); *B32B 2307/732* (2013.01)

(58) Field of Classification Search
None
See application file for complete search history.

(56) References Cited

U.S. PATENT DOCUMENTS

| 7,821,126 B2 | 10/2010 | Houle et al. |
| 11,067,600 B2 | 7/2021 | Takemura et al. |
| 2003/0007329 A1* | 1/2003 | Hill ............... H01L 23/4275 257/E23.089 |
| 2011/0141698 A1* | 6/2011 | Chiou ............ H01L 23/3737 361/708 |
| 2019/0181069 A1* | 6/2019 | Rykaczewski ...... B32B 27/283 |

FOREIGN PATENT DOCUMENTS

| CN | 1314305 | 5/2007 |
| CN | 101322232 | 12/2008 |
| CN | 101420835 | 4/2009 |
| CN | 103740978 | 4/2014 |

(Continued)

OTHER PUBLICATIONS

Cai et al., machine translation of CN 111235459 Abstract and Description, Jun. 5, 2020 (Year: 2020).*

(Continued)

*Primary Examiner* — Mary I Omori
(74) *Attorney, Agent, or Firm* — JCIPRNET

(57) ABSTRACT

A low-melting-point alloy composite material and a composite material structure are provided. The low-melting-point alloy composite material includes 48 to 54 wt. % In, 30 to 36 wt. % Bi, 14 to 21 wt. % Sn, and at least one selected from 0.1 to 0.3 wt. % carbon material and 0.05 to 0.1 wt. % boron nitride (BN). The composite material structure includes a metal layer, a low-melting-point alloy composite material layer, and an interface material layer, wherein the material of the low-melting-point alloy composite material layer is the above low-melting-point alloy composite material, and the interface material layer is formed between the metal layer and the low-melting-point alloy composite material layers.

10 Claims, 1 Drawing Sheet

(56) References Cited

FOREIGN PATENT DOCUMENTS

| CN | 103740997 | | | 4/2014 | |
|---|---|---|---|---|---|
| CN | 104263994 | | | 1/2015 | |
| CN | 104263994 | A | * | 1/2015 | |
| CN | 104726070 | A | * | 6/2015 | ............... C09K 5/06 |
| CN | 105483486 | | | 4/2016 | |
| CN | 105838333 | | | 8/2016 | |
| CN | 106675529 | | | 5/2017 | |
| CN | 106701031 | | | 5/2017 | |
| CN | 108192576 | | | 6/2018 | |
| CN | 108329830 | | | 7/2018 | |
| CN | 109894602 | | | 6/2019 | |
| CN | 110306091 | | | 10/2019 | |
| CN | 110643331 | | | 1/2020 | |
| CN | 110862572 | | | 3/2020 | |
| CN | 111235459 | | | 6/2020 | |
| CN | 111315709 | | | 6/2020 | |
| CN | 111040736 | | | 5/2021 | |
| TW | 200936028 | | | 8/2009 | |
| TW | I342741 | | | 5/2011 | |
| TW | I349352 | | | 9/2011 | |
| TW | I653720 | | | 3/2019 | |
| TW | I730708 | | | 6/2021 | |

OTHER PUBLICATIONS

Ding et al., machine translation CN 104263994, Jan. 7, 2015 (Year: 2015).*

E. Yang et al., "Thermal Performance of Low-Melting-Temperature Alloy Thermal Interface Materials", Acta Metall. Sin. (Engl. Lett.), Mar. 2014, pp. 290-294.

Zuoye Lin et al., "High thermal conductivity liquid metal pad for heat dissipation in electronic devices", Applied Physics A, Apr. 2018, pp. 1-6.

Kaiyuan Huang et al., "An anti-leakage liquid metal thermal interface material", RSC Advances, May 2020, pp. 18824-18829.

"Office Action of Taiwan Counterpart Application", dated Jan. 18, 2023, p. 1-p. 7.

* cited by examiner

LOW-MELTING-POINT ALLOY COMPOSITE MATERIAL AND COMPOSITE MATERIAL STRUCTURE

CROSS-REFERENCE TO RELATED APPLICATION

This application claims the priority benefit of Taiwan application serial no. 111122824, filed on Jun. 20, 2022. The entirety of the above-mentioned patent application is hereby incorporated by reference herein and made a part of this specification.

TECHNICAL FIELD

The present disclosure relates to a low-melting-point alloy composite material and a composite material structure.

BACKGROUND

As modern electronic products become slimmer, lighter and operate with high performance and transmission rate, the temperature of various components (such as CPU and GPU) rises more significantly while operating, which in turn causes the thermal power of the components and system to increase. Conventional electronic components having lower thermal power usually mainly relies on heat sinks or fans as the heat dissipation solution to improve the heat dissipation efficiency, while important factors such as contact thermal resistance and diffusion thermal resistance are often neglected.

As system functions and powers improve, higher quality standards are given to the thermal management technology. In addition to employing heating elements with low thermal resistance and elements with high-efficiency heat dissipation, the assembly interface between each material and heat dissipation elements is also a key to thermal management technology for heat to dissipate from within to outside the components of electronic products.

Contacts between components basically define the heat dissipating path. When two components are engaged with each other, a perfect contact cannot be achieved even with great surface flatness or a large mounted pressure, achieving only partial contact as many fine voids or holes still exist on the contact surfaces. With air being a medium with poor thermal conductivity that hinders the thermal conductivity, it is necessary for a thermal interface material (TIM) to fill the gaps between the joints to improve the heat transfer efficiency and reduce the interface heat resistance.

There is still room for the heat transfer efficiency of commercial TIMs to improve. And it is essential for TIM to be able to fill the gaps between two contact surfaces. Therefore, in addition to thermal conductivity, TIM also needs to have sufficient fluidity and deformation ability to fill the gaps fully.

SUMMARY

The low-melting-point alloy composite material of the disclosure includes 48 to 54 wt. % In, 30 to 36 wt. % Bi, 14 to 21 wt. % Sn, and at least one selected from 0.1 to 0.3 wt. % carbon material and 0.05 to 0.1 wt. % BN.

The composite material structure of the disclosure includes a metal layer, a low-melting-point alloy composite material layer, and an interface material layer. The material of the low-melting-point alloy composite material layer includes the above-mentioned low-melting-point alloy composite material, and the interface material layer is formed between the metal layer and the low-melting-point alloy composite material layer.

To make the above features of the disclosure more comprehensible, the following embodiments are described in detail as follows with reference to the drawings.

DESCRIPTION OF THE EMBODIMENTS

Figure 1:
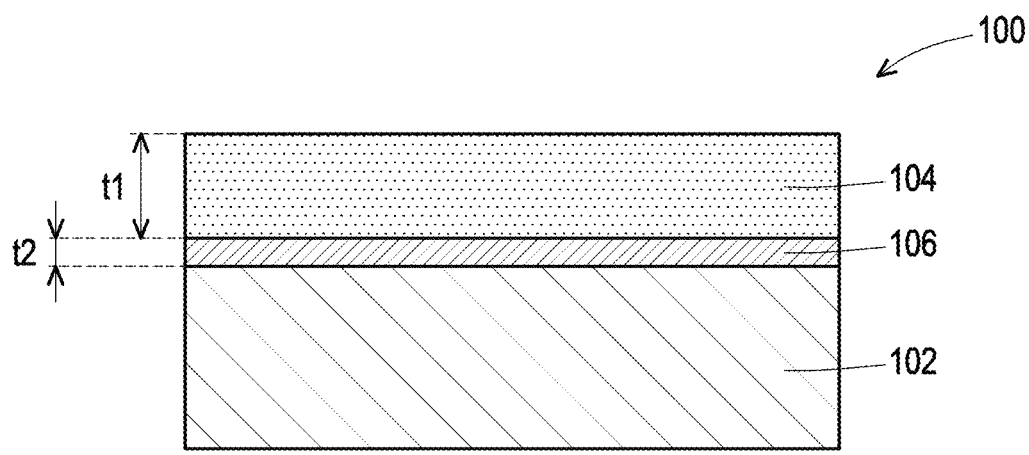
FIG. 1 is a schematic cross-sectional view of a composite material structure according to an embodiment of the disclosure.

Please refer to the following embodiments and drawings for full comprehension of the disclosure. As the disclosure may be realized in different forms, the disclosure should not be construed as limitations to the embodiments described herein. For the sake of clarity, the components and their relative dimensions may not be presented according to actual scale in the drawings.

One embodiment of the disclosure is a low-melting-point alloy composite material, including 48 to 54 wt. % In (indium), 30 to 36 wt. % Bi (bismuth), 14 to 21 wt. % Sn (tin), and at least one selected from 0.1 wt. % to 0.3 wt. % carbon material and 0.05 to 0.1 wt. % BN (boron nitride). Unless specified otherwise, the weight percentage (wt. %) of the aforementioned composition is based on the total weight of the low-melting-point alloy composite material as 100 wt. %. In addition, the low-melting-point alloy composite material of this embodiment may contain inevitable impurities.

In one embodiment, the melting point of the low-melting-point alloy composite material is 55° C. to 72° C.; for example, 55° C. to 65° C.

In one embodiment, the content of indium in the low-melting-point alloy composite material is, for example, 50 to 54 wt. %.

In one embodiment, the content of tin in the low-melting-point alloy composite material is, for example, 14 to 18 wt. %.

In one embodiment, the carbon material includes graphite or graphene. For example, nanoscale thermally conductive graphite may be selected as graphite.

In one embodiment, the low-melting-point alloy composite material may simultaneously include 0.1 to 0.3 wt. % carbon material and 0.05 to 0.1 wt. % BN. In another embodiment, the low-melting-point alloy composite material only contains 0.1 to 0.3 wt. % carbon material without BN; or, the low-melting-point alloy composite material only contains 0.05 to 0.1 wt. % BN, without carbon material.

FIG. 1 is a schematic cross-sectional view of a composite material structure according to an embodiment of the disclosure.

In FIG. 1, the composite material structure 100 of this embodiment includes a metal layer 102, a low-melting-point alloy composite layer 104, and an interface material layer 106. The material of the low-melting-point alloy composite material layer 104 is the low-melting-point alloy composite material in the previous embodiment, and the interface material layer 106 is formed between the metal layer 102 and the low-melting-point alloy composite material layer 104. The thickness t1 of the low-melting-point alloy composite material layer 104 is, for example, 50 μm to 200 μm, and the thickness t2 of the interface material layer 106 may be, for example, less than 20 μm, less than 15 μm, or less than 10 μm. The thermal conductivity of the low-melting-point alloy composite material layer 104 is above 20 W/m·K; for example, it is greater than 26 W/m·K.

In FIG. 1, if the material of the metal layer 102 is copper or copper alloy, the material of the interface material layer 106 may be copper indium tin alloy, and it is 46Cu-27In-24Sn or a copper indium tin alloy with a composition ratio approaching 46Cu-27In-24Sn. That is to say, the interface material layer 106 is the intermetallic compound (IMC) formed by the interface between the low-melting-point alloy composite material (i.e., the low-melting-point alloy composite material layer 104) and the metal layer 102 after several solid-liquid phase transitions in the previous embodiment.

Several experiments are listed below to verify the efficacy of the disclosure, but the disclosure is not limited to the following contents.

<Preparation Examples 1 to 8> Preparation of Indium-Bismuth-Tin Alloy

The raw materials of indium, bismuth, and tin at different weight ratios were put into a stainless steel heating pot and heated to 170° C. to melt evenly and form an indium-bismuth-tin alloy.

Then, an alloy phase analysis was performed by X-ray diffraction analysis (XRD), and an alloy composition analysis was performed by X-ray fluorescence analysis (XRF). The results are shown in Table 1 below. In addition, the melting-point analysis of the alloy was carried out by a differential scanning calorimeter (DSC), and the results are also shown in Table 1.

TABLE 1

| Preparation Example | main composition of alloy (weight percentage) | melting point (° c.) |
|---|---|---|
| 1 | 54In—32Bi—14Sn | 61.6 |
| 2 | 51In—32.5Bi—16.5Sn | 61.4 |
| 3 | 51.1In—32.9Bi—16Sn | 61.2 |
| 4 | 50.1In—35.9Bi—14Sn | 60.6 |
| 5 | 51.4In—31.4Bi—17.2Sn | 61.5 |
| 6 | 51.1In—31.6Bi—16.8Sn | 61.3 |
| 7 | 48.4In—31Bi—20.6Sn | 65.1 |
| 8 | 66In—34Bi | 72 |

As shown in Table 1, indium-bismuth-tin alloys at a composition ratio of indium to bismuth to tin within the scope of the disclosure have lower melting points.

Preparation Examples 9 to 19

According to Table 2, nanoscale thermally conductive graphite and/or boron nitride (the boron nitride nanopowder purchased from US Research Nanomaterials) were added at different weight ratios to the indium-bismuth-tin alloy of Preparation Example 2 and the materials were mixed uniformly to obtain the low-melting-point alloy composite materials labeled as Preparation Examples 9 to 19.

Then, the obtained low-melting-point alloy composite material was formed into a sheet with a thickness of 100 μm through pressing or rolling at room temperature. The thermal conductivity of the low-melting-point alloy composite was then measured by a thermal conductivity meter (Hot Disk TPS3500). The results are shown in Table 2 below. Table 3 is the weight percentage of each component re-calculated according to the above preparation.

TABLE 2

| Preparation Example | weight percentage of carbon material (C) or BN | thermal conductivity (W/m · K) |
|---|---|---|
| 2 | None | 26 |
| 9 | 0.05 wt. % C | 26 |
| 10 | 0.1 wt. % C | 27 |
| 11 | 0.2 wt. % C | 28 |
| 12 | 0.3 wt. % C | 30 |
| 13 | 0.5 wt. % C | C precipitated in large quantities (unmeasurable) |
| 14 | 0.2 wt. % BN | not formed into flakes (unmeasurable) |
| 15 | 0.1 wt. % BN | 27 |
| 16 | 0.03 wt. % BN | 26 |
| 17 | 0.3 wt. % C + 0.05 wt. % BN | 30 |
| 18 | 0.2 wt. % C + 0.10 wt. % BN | 30 |
| 19 | 0.1 wt. % C + 0.05 wt. % BN | 28 |

TABLE 3

| Preparation Example | composition at weight percent (wt. %) | | | | |
|---|---|---|---|---|---|
| | In | Bi | Sn | Graphite | BN |
| 2 | 51 | 32.5 | 16.5 | 0 | 0 |
| 9 | 50.97 | 32.48 | 16.5 | 0.05 | 0 |
| 10 | 50.95 | 32.46 | 16.48 | 0.1 | 0 |
| 11 | 50.90 | 32.44 | 16.46 | 0.2 | 0 |
| 12 | 50.85 | 32.40 | 16.45 | 0.3 | 0 |
| 13 | 50.74 | 32.34 | 16.42 | 0.5 | 0 |
| 14 | 50.90 | 32.44 | 16.47 | 0 | 0.2 |
| 15 | 50.95 | 32.46 | 16.48 | 0 | 0.1 |
| 16 | 50.98 | 32.49 | 16.50 | 0 | 0.03 |
| 17 | 50.82 | 32.39 | 16.44 | 0.3 | 0.05 |
| 18 | 50.85 | 32.40 | 16.45 | 0.2 | 0.1 |
| 19 | 50.92 | 32.45 | 16.48 | 0.1 | 0.05 |

As shown in Table 2 and Table 3, the addition of carbon material and/or BN at a specific composition ratio into the indium-bismuth-tin alloy improves the thermal conductivity of the material to 30 W/m·K.

Figure 2:
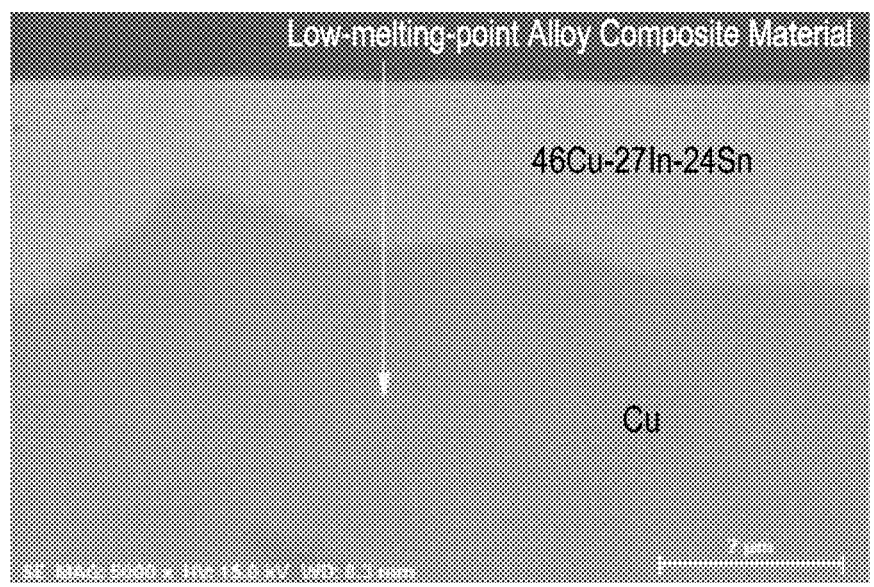
FIG. 2 is a scanning electron microscope (SEM) image of a cross-section of a composite material structure containing the low-melting-point alloy composite of Preparation Example 11.

In addition, the low-melting-point alloy composite material of Preparation Example 11 was adopted, which was placed between a silicon sheet and a copper sheet and subjected to a reaction at 100° C. for 300 hrs. The cross-section was observed with a scanning electron microscope (SEM), and the composite material structure as shown in FIG. 2 was obtained. Only part of the low-melting-point alloy cladding layer and part of the copper sheet are shown in FIG. 2, and the arrow represents the direction of SEM analysis.

FIG. 2 shows that an intermetallic compound (IMC) layer with a thickness of about 5 to 7 μm is formed between the low-melting-point alloy cladding layer and the copper, and the composition analysis shows that the IMC is 46Cu-27In-24Sn.

Preparation Examples 20 to 25

When preparing Preparation Examples 20 to 25, the In—Bi—Sn ratio was changed according to Table 4, and nanoscale thermally conductive graphite and/or boron nitride (the boron nitride nanopowder purchased from US Research Nanomaterials) were added at different weight ratios and mixed uniformly to obtain Preparation Examples 20 to 25 Examples of low-melting-point alloy composites and their thermal conductivity. The thermal conductivity was then measured in the same way as in the Preparation Example 9 above. The results are shown in Table 4 below.

TABLE 4

| Preparation Example | composition at weight percent (wt. %) | | | | | thermal conductivity (W/m · K) |
|---|---|---|---|---|---|---|
| | In | Bi | Sn | Graphite | BN | |
| 20 | 51.1 | 32.9 | 16 | 0 | 0 | 26 |
| 21 | 50.95 | 32.8 | 15.95 | 0.3 | 0 | 30 |
| 22 | 51.05 | 32.87 | 15.98 | 0 | 0.1 | 27 |
| 23 | 51.4 | 31.4 | 17.2 | 0 | 0 | 26 |
| 24 | 51.25 | 31.3 | 17.15 | 0.3 | 0 | 30 |
| 25 | 51.25 | 31.3 | 17.15 | 0.25 | 0.05 | 30 |

As shown in Table 4, even if the In—Bi—Sn ratio of the indium-bismuth-tin alloy is changed (not 51In-32.5Bi-16.5Sn), the thermal conductivity of the material is still improved as long as carbon material and/or BN were added at specific ratios.

Experimental Examples 1 to 4

The low-melting-point alloy composites of Preparation Examples 12, 15, 17, and 18 with a thickness of 100 μm were adopted as the thermal interface material (TIM) between the central processing unit (CPU) and the heat dissipation module.

Then, the temperature of the CPU of Intel i7-8750H PRIME95@65W was measured and listed in Table 5 below.

Comparative Example 1

The indium-bismuth-tin alloy of Preparation Example 2 was adopted as the thermal interface material, and the temperature of the CPU of Intel i7-8750H PRIME95@65W was measured in the same way as in Experimental Example 1. The result is also shown in Table 5 below.

Comparative Example 2

The commercially available DC5026 thermal paste was used as the thermal interface material, and the temperature of the CPU of the Intel i7-8750H PRIME95@65W was measured in the same way as in Experimental Example 1. The result is also shown in Table 5 below.

TABLE 5

| Thermal interface material | Comparative Example 1 Preparation Example 2 | Experimental Example 1 Preparation Example 12 | Experimental Example 2 Preparation Example 15 | Experimental Example 3 Preparation Example 17 | Experimental Example 4 Preparation Example 18 | Comparative Example 2 DC5026 |
|---|---|---|---|---|---|---|
| CPU temperature after 65 W thermal equilibrium (° C.) | 85 | 83 | 84 | 83 | 83 | 87 |

It can be seen from Table 5 that under the same conditions, the low-melting-point alloy composite material of the disclosure has excellent heat-dissipation performance as a thermal interface material.

In summary, the disclosure improves the thermal conductivity and viscosity of the indium-bismuth-tin alloy composite material by adding carbon materials and boron nitride, and the alloy composite material of the disclosure has a low melting point of 55° C. to 72° C. because of the adjustment of the indium-bismuth-tin composition. Therefore, the low-melting-point alloy composite material of the disclosure applied between silicon (or silicon alloy) and copper (or copper alloy) that forms an IMC layer between the copper and the low-melting-point alloy composite material layer is able to maintain the defect-free interface bonding conditions between the metal and the low-melting-point alloy composite material, and reduce the interface thermal resistance, which is beneficial to the development and application of the heat-dissipation module technology of the next-generation, high-speed networked gaming processor.

Although the disclosure has been disclosed above by the embodiments, it is not intended to limit the disclosure. Anyone with ordinary knowledge in the technical field can make changes and modifications without departing from the spirit and scope of the disclosure. Therefore, the protection scope of the disclosure shall be determined by the scope of the following claims.

What is claimed is:

1. A low-melting-point alloy composite material, comprising:
   48 to 54 wt. % In;
   to 36 wt. % Bi;
   14 to 21 wt. % Sn; and
   at least one selected from 0.1 to 0.3 wt. % carbon material and 0.05 to 0.1 wt. % BN,
   wherein the carbon material comprises graphite.

2. The low-melting-point alloy composite material according to claim 1, having a melting point of 55° C. to 72° C.

3. The low-melting-point alloy composite material according to claim 1, comprising 0.1 to 0.3 wt. % carbon material and 0.05 to 0.1 wt. % BN.

4. A composite material structure, comprising:
   a metal layer;
   a low-melting-point alloy composite material layer, comprising materials of the low-melting-point alloy composite material according to claim 1; and
   an interface material layer formed between the metal layer and the low-melting-point alloy composite material layer.

5. The composite material structure according to claim 4, wherein a thickness of the interface material layer is less than 20 μm.

6. The composite material structure according to claim 4, wherein a thickness of the low-melting-point alloy composite layer is 50 μm to 200 μm.

7. The composite material structure according to claim 4, wherein a thermal conductivity of the low-melting-point alloy composite layer is greater than 26 W/m·K.

8. The composite material structure according to claim 4, wherein a material of the metal layer comprises copper or copper alloy.

9. The composite material structure according to claim 8, wherein a material of the interface material layer comprises copper indium tin alloy.

10. The composite material structure according to claim 9, wherein the copper indium tin alloy is 46Cu-27In-24Sn.

* * * * *